(12) United States Patent
Shibata et al.

(10) Patent No.: US 11,772,477 B2
(45) Date of Patent: Oct. 3, 2023

(54) DRIVE UNIT FOR HYBRID VEHICLE

(71) Applicant: TOYOTA JIDOSHA KABUSHIKI KAISHA, Toyota (JP)

(72) Inventors: Hiroyuki Shibata, Odawara (JP); Hiroyuki Hattori, Okazaki (JP); Akira Murakami, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/501,605

(22) Filed: Oct. 14, 2021

(65) Prior Publication Data

US 2022/0153118 A1 May 19, 2022

(30) Foreign Application Priority Data

Nov. 17, 2020 (JP) .................................. 2020-190896

(51) Int. Cl.
| | |
|---|---|
| *B60K 6/445* | (2007.10) |
| *B60K 6/547* | (2007.10) |
| *B60K 6/365* | (2007.10) |
| *B60K 6/48* | (2007.10) |

(52) U.S. Cl.
CPC ............. *B60K 6/445* (2013.01); *B60K 6/365* (2013.01); *B60K 6/547* (2013.01); *B60K 2006/4833* (2013.01)

(58) Field of Classification Search
None
See application file for complete search history.

(56) References Cited

FOREIGN PATENT DOCUMENTS

| | | | | | |
|---|---|---|---|---|---|
| CN | 108725177 | A | * | 11/2018 | ............ B60K 6/365 |
| CN | 209159405 | U | * | 7/2019 | |
| CN | 110395105 | A | * | 11/2019 | |
| JP | 2001-260669 | A | | 9/2001 | |
| JP | 2003-291670 | A | | 10/2003 | |
| JP | 2019-073158 | A | | 5/2019 | |
| JP | 2019-131031 | A | | 8/2019 | |
| JP | 2020-093666 | A | | 6/2020 | |
| WO | WO-2021102684 | A1 | * | 6/2021 | ............ B60K 6/365 |

OTHER PUBLICATIONS

CN 108725177 A1 translation (Year: 2020).*
CN 110395105 A1 translation (Year: 2020).*
CN 209159405 U1 translation (Year: 2020).*
WO 20211102684 A1 translation (Year: 220).*

* cited by examiner

*Primary Examiner* — Edwin A Young
(74) *Attorney, Agent, or Firm* — Oliff PLC

(57) ABSTRACT

A drive unit for a hybrid vehicle that is downsized without reducing N.V. performance. The drive unit comprises: a geared transmission that transmits torque between a power split mechanism and a differential unit; and a reduction mechanism that multiplies torque of a second motor to be delivered to the differential unit. In the drive unit, an engine, a first motor, the power split mechanism, and a counter drive gear are arranged around a first rotational axis, the differential unit, the second motor, the reduction mechanism, driveshafts, and a differential ring gear are arranged around a second rotational axis, and a counter driven gear is arranged around a third rotational axis. The reduction mechanism is positioned without overlapping with the engine, the first motor, and the counter drive gear in an axial direction.

15 Claims, 9 Drawing Sheets

DRIVE UNIT FOR HYBRID VEHICLE

CROSS REFERENCE TO RELATED APPLICATIONS

The present disclosure claims the benefit of Japanese Patent Application No. 2020-190896 filed on Nov. 17, 2020 with the Japanese Patent Office, the disclosure of which is incorporated herein by reference in its entirety.

BACKGROUND

Field of the Disclosure

Embodiments of the present disclosure relate to the art of a drive unit for a hybrid vehicle in which a prime mover includes an engine and two motors.

Discussion of the Related Art

JP-A-2001-260669 describes one example of a drive unit for a hybrid vehicle in which a prime mover includes an engine, a first motor, and a second motor. In a hybrid driving device described in JP-A-2001-260669, a planetary gear set serving as a power split mechanism and the first motor having a generating function are arranged coaxially with the engine. An output gear connected to an output element of the power split mechanism is arranged between the engine and the power split mechanism while being meshed with a counter gear, and a ring gear of a differential unit as a final reduction is meshed with the output gear. The counter gear is also meshed with a drive gear mounted on a rotor shaft of the second motor arranged in parallel with the first motor. That is, the hybrid driving device taught by JP-A-2001-260669 has four rotational axes including: a common rotational axis of the engine, the first motor, and the power split mechanism; a rotational axis of the second motor; a rotational axis of the counter gear; and a rotational axis the differential unit. That is, the hybrid driving device taught by JP-A-2001-260669 comprises four speed reducing sections including: a speed change section of the power split mechanism; a speed reducing section composed of the output gear and the counter gear; a speed reducing section composed of the counter gear and the ring gear; and a speed reducing section the other speed change part is composed of a drive gear of the second motor and the counter gear.

Other examples of the drive unit are described in JP-A-2019-73158 and JP-A-2019-131031. According to the teachings of those prior art documents, a structure of the power transmission unit is simplified to downsize the drive unit. Each of the drive units described in those prior art documents comprises: an engine; a first motor having a generating function arranged coaxially with the engine; a planetary gear set as a power split mechanism including an input element connected to the engine, a reaction element connected to the first motor, and an output element connected to a differential unit; and a second motor arranged in parallel with the first motor and coaxially with a differential unit. A torque of the second motor is synthesized with a torque delivered to a differential gear. In the drive unit of this kind, a first speed reduction mechanism as a chain-drive mechanism is arranged between the output element of the planetary gear set and the differential unit to multiply the torque of the output element delivered to the differential unit, and a second speed reduction mechanism is arranged coaxially with the second motor and the differential unit to multiply the torque of the second motor delivered to the differential unit. That is, each of the drive units described in the above-mentioned prior art documents has two rotational axes including: a common rotational axis of the engine, the first motor, and the power split mechanism; and a common rotational axis of the differential unit, the second motor, and the second speed reduction mechanism. In the drive unit of this kind, the first speed reduction mechanism is located between the above-mentioned rotational axes.

JP-A-2003-291670 describes a drive unit for a front engine rear drive layout hybrid vehicle. The drive unit taught by JP-A-2003-291670 comprises an engine, a first motor, a planetary gear set as a power split mechanism, and a second motor. In the drive unit taught by JP-A-2003-291670, the engine is arranged longitudinally, and coaxially with the first motor, the power split mechanism, and a propeller shaft. The propeller shaft is connected to a differential unit through a hypoid gear formed on a leading end thereof, and the second motor is arranged parallel to right and left driveshafts. That is, the drive unit taught by JP-A-2003-291670 has three rotational axes including: a common rotational axis of the engine, the first motor, and the planetary gear set, and the propeller shaft; a rotational axis of the second motor; and a rotational axis of the differential unit and the driveshafts.

Referring now to FIG. 1, there is shown a cross-section of the hybrid driving device described in JP-A-2001-260669. As illustrated in FIG. 1, in the hybrid driving device described in JP-A-2001-260669, the engine 101, the first motor 102, and the power split mechanism 103 are arranged coaxially around the first rotational axis 100. The second motor 201 and a drive gear 202 of the second motor 201 are arranged coaxially around the second rotational axis 200, a driven gear 301 and a drive pinion 302 are arranged coaxially around the third rotational axis 300, and the differential unit 401 and a ring gear 402 of the differential unit 401 are arranged coaxially around the fourth rotational axis 400. Specifically, the drive gear 202 meshed with the driven gear 301, which also is meshed with the drive gear 104 and the second motor 201 to which the drive gear 202 is attached are arranged around the second rotational axis 200. For this reason, a height of the hybrid driving device has to be increased.

On the other hand, the drive units described in JP-A-2019-73158 and JP-A-2019-131031 are downsized by employing the chain-drive mechanism. In each of those drive units, the second motor is arranged coaxially with the differential gear and the driveshafts so that an upper section of each of the drive units is reduced. However, although it is possible to maintain a distance between the rotational axis by employing the chain-drive mechanism, noises and vibrations may be generated in a high-speed range.

SUMMARY

Aspects of embodiments of the present disclosure have been conceived noting the foregoing technical problems, and it is therefore an object of the present disclosure to provide a drive unit for a hybrid vehicle that is downsized without reducing N.V. performance.

The drive unit for a hybrid vehicle according to the exemplary embodiment of the present disclosure comprises: a prime mover including an engine, a first motor, and a second motor; a pair of driveshafts each of which is connected to a respective one of a right drive wheel and a left drive wheel; a power split mechanism that distributes an output torque of the engine to the first motor and the driveshafts; a differential unit to which an output torque of the second motor is delivered, and which allows the driveshafts to rotate at different speeds; a geared transmission that transmits a torque between the power split mechanism and the differential unit; and a reduction mechanism that multiplies the output torque of the second motor to be delivered to the differential unit. In order to achieve the above-explained objective, according to the exemplary embodiment of the present disclosure, the power split mechanism as a planetary gear set comprises: an input element that is connected to the engine; a reaction element that is connected to the first motor; and an output element. On the other hand, the geared transmission comprises: a counter drive gear that is connected to the output element; a counter driven gear that is meshed with the counter drive gear; and a differential ring gear that is meshed with the counter driven gear to transmit the torque to the differential unit. In the drive unit, the engine, the first motor, the power split mechanism, and the counter drive gear are arranged around a first rotational axis. Whereas, the differential unit, the second motor, the reduction mechanism, the driveshafts, and the differential ring gear are arranged around a second rotational axis extending parallel to the first rotational axis. The counter driven gear is arranged around a third rotational axis extending parallel to the second rotational axis and the first rotational axis. Specifically, the reduction mechanism is positioned without overlapping with any of the engine, the first motor, and the counter drive gear in an axial direction.

In a non-limiting embodiment, the reduction mechanism may be positioned while overlapping with the power split mechanism in the axial direction.

In a non-limiting embodiment, the engine, the first motor, the power split mechanism, and the counter drive gear may be arranged in order from one side in the axial direction. Whereas, the second motor, the reduction mechanism, and the differential ring gear may be arranged in order in the axial direction from said one side.

In a non-limiting embodiment, the power split mechanism may be a planetary gear set comprising: a first carrier that serves as the input element; a first sun gear that serves as the reaction element; and a first ring gear that serves as the output element. On the other hand, the reduction mechanism may be a stepped-pinion planetary gear set comprising: a second sun gear that is connected to the second motor; a second ring gear that is fixed and not allowed to rotate; a diametrically larger pinion that is meshed with the second sun gear; a diametrically smaller pinion that is diametrically smaller than the diametrically larger pinion, and that is rotated integrally with the diametrically larger pinion while being meshed with the second ring gear; and a second carrier that is connected to the differential ring gear while supporting the diametrically larger pinion and the diametrically smaller pinion.

In a non-limiting embodiment, the drive unit may further comprise a case that holds at least the first motor, the power split mechanism, the geared transmission, the differential unit, the reduction mechanism, and the second motor. The case may comprise a first bulkhead that closes one end of the first motor in the axial direction, and a second bulkhead that closes the other end of the first motor in the axial direction. The first motor may comprise a hollow rotor shaft that rotates integrally with a rotor of the first motor. The power split mechanism may further comprise an input shaft that is connected to the engine and that is rotated integrally with the first carrier. In the drive unit, both ends of the rotor shaft may be supported by a first bearing held by the first bulkhead and a second bearing held by the second bulkhead, and both ends of the input shaft may also be supported by the first bearing and the second bearing through a third bearing and a fourth bearing arranged in a hollow space of the rotor shaft.

In a non-limiting embodiment, the case may further comprise a third bulkhead that closes one end of the geared transmission in the axial direction, and a fourth bulkhead that closes the other end of the geared transmission in the axial direction. In the drive unit, both ends of the counter drive gear may be supported by a fifth bearing held by the third bulkhead and a sixth bearing held by the fourth bulkhead, and both ends of the counter driven gear may be supported by a seventh bearing held by the third bulkhead and an eighth bearing held by the fourth bulkhead.

In a non-limiting embodiment, the engine, the counter drive gear, the power split mechanism, and the first motor may be arranged in order from one side in the axial direction, and the differential ring gear, the reduction mechanism, and the second motor may be arranged in order in the axial direction from said one side in the axial direction.

In a non-limiting embodiment, the engine, the counter drive gear, the power split mechanism, and the first motor may be arranged in order from one side in the axial direction, and the reduction mechanism, the differential ring gear, and the second motor may be arranged in order in the axial direction from said one side.

In a non-limiting embodiment, the engine, the counter drive gear, the power split mechanism, and the first motor may be arranged in order from one side in the axial direction, and the second motor, the differential ring gear, and the reduction mechanism may be arranged in order in the axial direction from said one side.

In a non-limiting embodiment, the engine, the counter drive gear, the power split mechanism, and the first motor may be arranged in order from one side in the axial direction, and the second motor, the reduction mechanism, and the differential ring gear may be arranged in order in the axial direction from said one side.

In a non-limiting embodiment, the drive unit may further comprise an additional reduction mechanism that is arranged between the second motor and the reduction mechanism to multiply the output torque of the second motor to be delivered to the reduction mechanism.

Thus, according to the exemplary embodiment of the present disclosure, the first motor, and the power split mechanism are arranged coaxially with the engine around the first rotational axis, and the differential unit as a final reduction and the driveshafts are arranged coaxially with the second motor around the second rotational axis extending parallel to the first rotational axis. In the drive unit, the torque is transmitted between the power split mechanism and the differential unit through the geared transmission comprising the counter drive gear, the counter driven gear, and the differential ring gear. As described, the counter drive gear is arranged around the first rotational axis, the differential ring gear is arranged around the second rotational axis, and the counter driven gear is arranged around the third rotational axis extending parallel to the second rotational axis and the first rotational axis. That is, the drive unit according to the exemplary embodiment of the present disclosure has a triaxial structure in which the main elements are arranged around the first to third rotational axes. According to the exemplary embodiment of the present disclosure, therefore, number of rotary elements of the drive unit may be reduced compared to the conventional drive unit having a quad-axial structure to downsize the drive unit smaller than the conventional drive unit having a quad-axial structure especially in the height direction of the hybrid vehicle.

Moreover, in the drive unit according to the exemplary embodiment of the present disclosure, the torque is transmitted between the first rotational axis and the second rotational axis through the geared transmission. That is, a chain-drive mechanism is not employed in the drive unit to transmit the torque between the power split mechanism and the differential unit. According to the exemplary embodiment of the present disclosure, therefore, noises and vibrations will not be generated by the chain-drive mechanism. For this reason, N.V. performance of the hybrid vehicle on which the drive unit is mounted can be improved.

Further, in the drive unit according to the exemplary embodiment of the present disclosure, the reduction mechanism arranged around the second rotational axis is positioned without overlapping with any of the engine, the first motor, and the counter drive gear arranged around the first rotational axis. In other words, the reduction mechanism is offset from the engine, the first motor, and the counter drive gear in the axial direction. For example, the reduction mechanism may be overlapped with the power split mechanism arranged around the first rotational axis in the axial direction. As described, the counter drive gear formed around the first rotational axis, the differential ring gear formed around the second rotational axis, and the counter driven gear formed around the third rotational axis overlap with one another in the axal direction to form the geared transmission. In addition, the engine and the first motor are diametrically larger than the power split mechanism. According to the exemplary embodiment of the present disclosure, therefore, the reduction mechanism may be positioned without overlapping with the engine and the first motor in the axial direction while overlapping with the power split mechanism whose outer diameter is relatively smaller. For this reason, a space for enlarging an outer diameter of the reduction mechanism can be ensured between an outer circumference of the reduction mechanism and the first rotational axis. That is, in the reduction mechanism, the diametrically larger pinion of a stepped-pinion may be diametrically enlarged thereby increasing a speed reducing ratio of the reduction mechanism. According to the first example, therefore, the output torque of the second motor can be further multiplied to be delivered to the differential unit. For this reason, the second motor may be downsized.

Thus, according to the exemplary embodiment of the present disclosure, the drive unit having the triaxial structure may be formed without employing the chain-drive mechanism. For this reason, the drive unit may be downsized without reducing the N.V. performance of the hybrid vehicle on which the drive unit is mounted.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

DETAILED DESCRIPTION OF THE PREFERRED EMBODIMENT(S)

Preferred embodiments of the present disclosure will now be explained with reference to the accompanying drawings.

Figure 1:
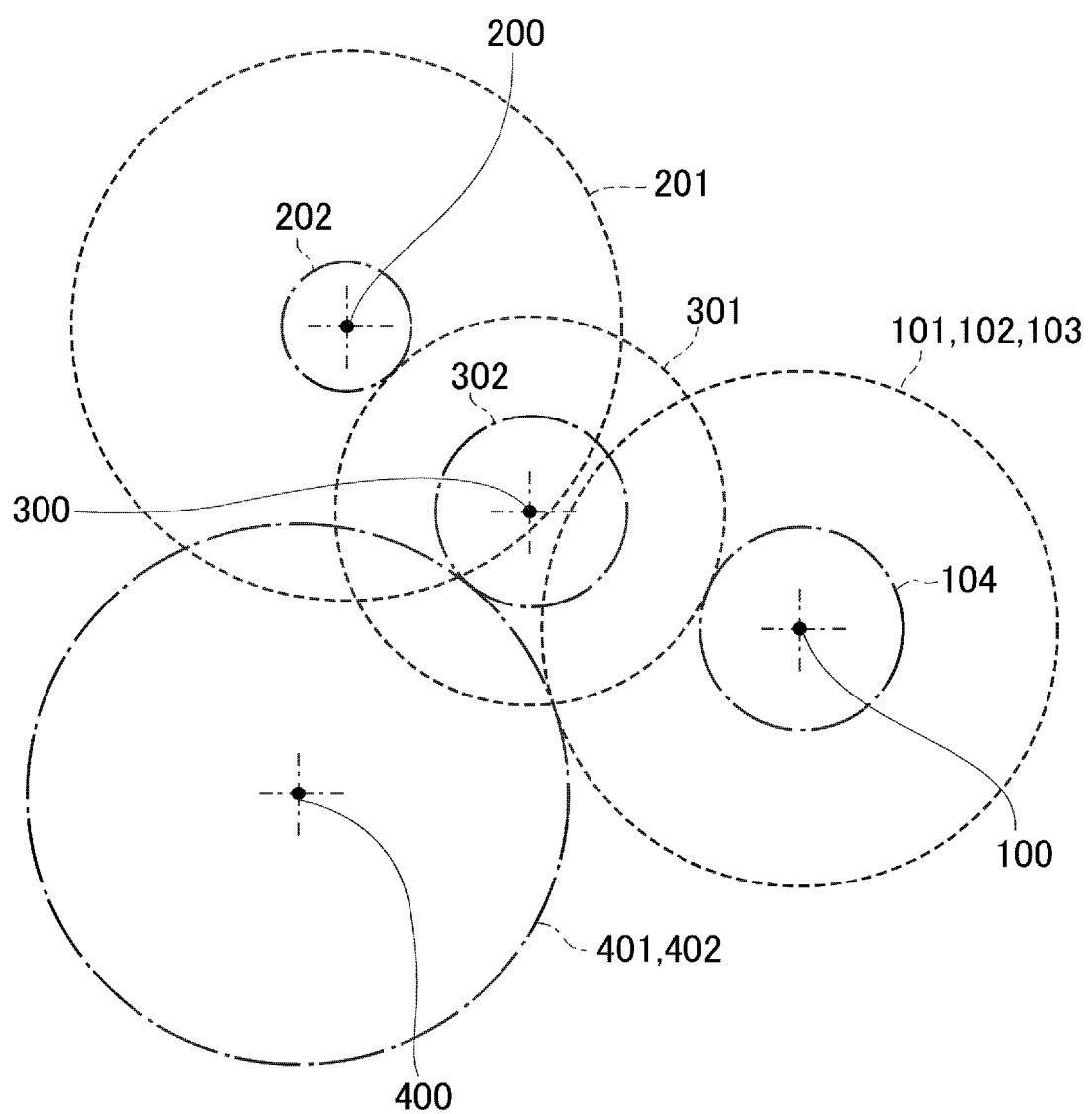
FIG. 1 is a cross-sectional view showing one example of a structure of a conventional drive unit.
Figure 2:
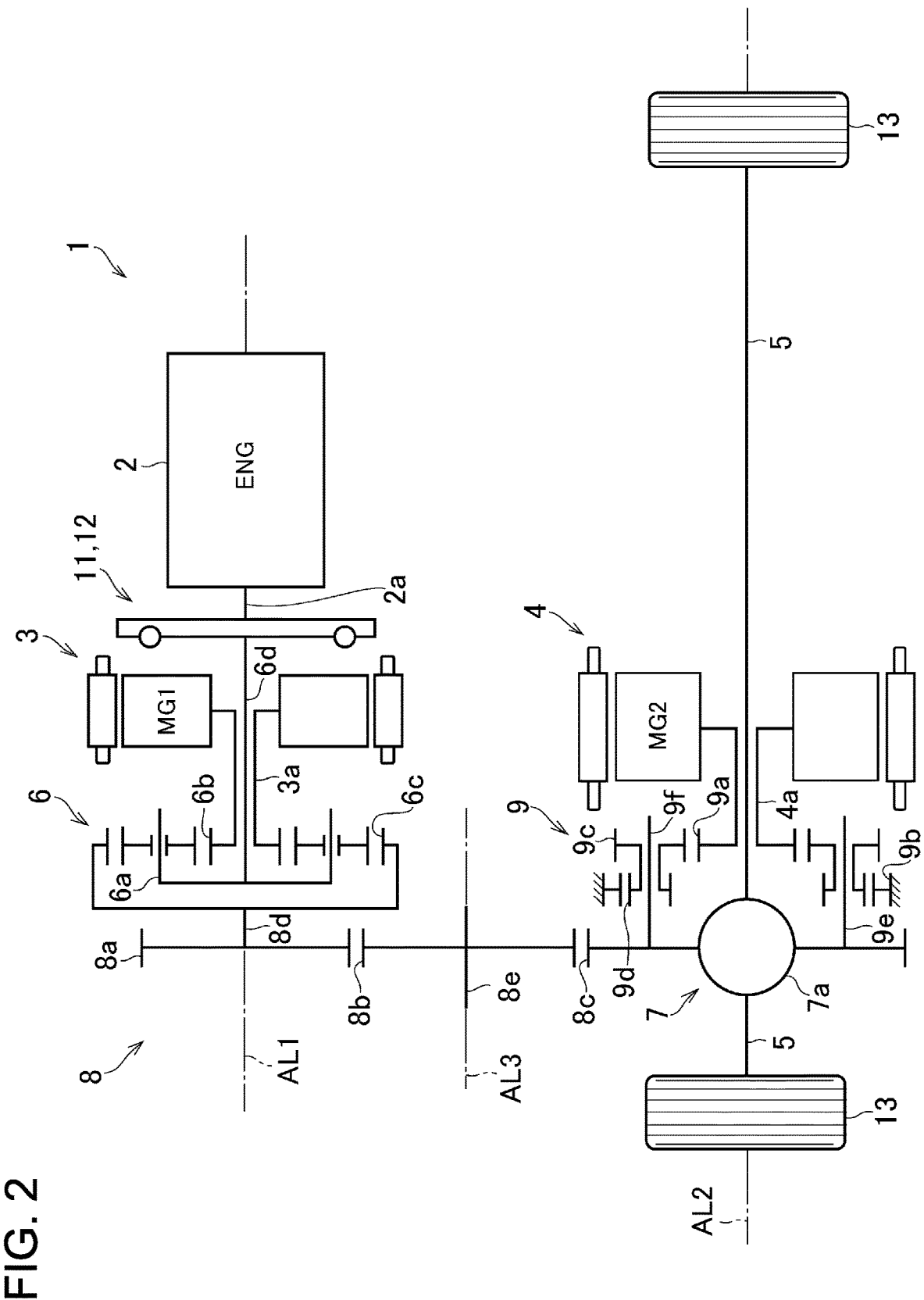
FIG. 2 is a skeleton diagram showing a layout of the drive unit according to the first example of the present disclosure.
Figure 3:
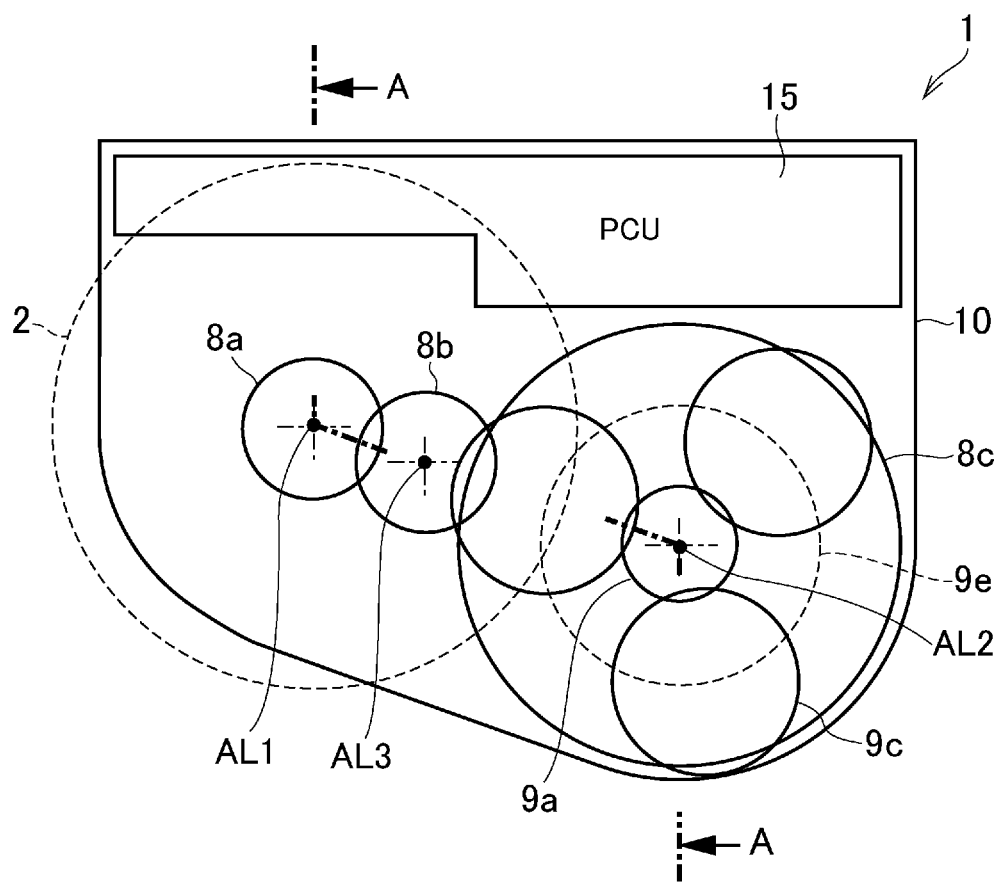
FIG. 3 is a schematic illustration showing positions of components of the drive unit according to the first example viewed from an axial direction.
Figure 4:
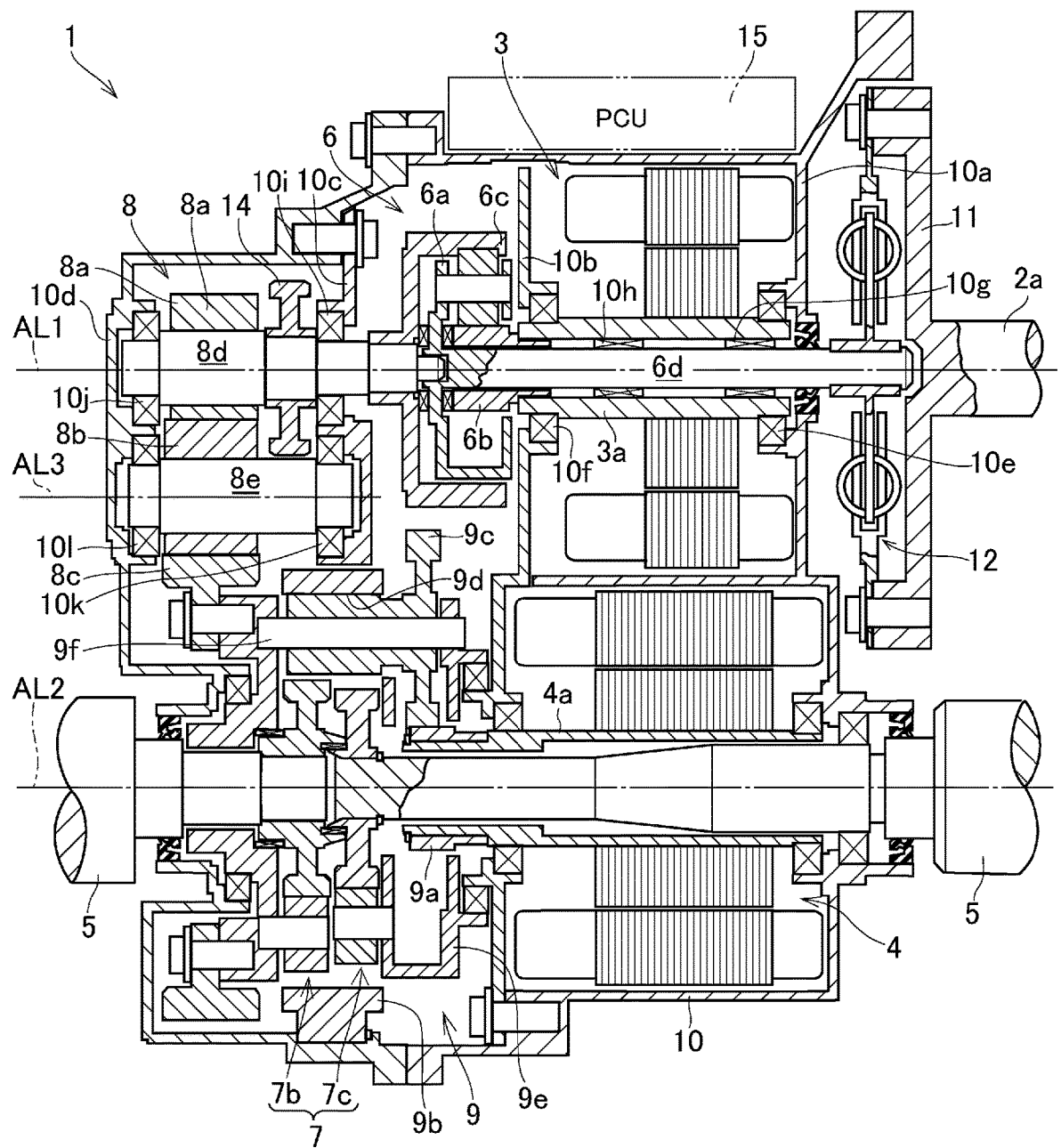
FIG. 4 is a developed view of the drive unit according to the first example expanded along the A-A line in FIG. 3.

The first example of a drive unit according to the present disclosure will now be explained with reference to FIGS. 2, 3 and 4. FIG. 2 is a skeleton diagram showing a gear train of a hybrid vehicle (as will be simply called the "vehicle" hereinafter) to which the drive unit 1 according to the first example is applied. FIG. 3 is a schematic illustration showing positions of components of the drive unit 1 viewed from an axial direction, and FIG. 4 is a developed view of the drive unit 1 expanded along the A-A line in FIG. 3.

The drive unit 1 comprises a prime mover including an engine 2 (referred to as "ENG" in the drawings), a first motor (referred to as "MG1" in the drawings) 3, and a second motor (referred to as "MG2" in the drawings) 4. The drive unit 1 further comprises a pair of driveshafts 5, a power split mechanism 6, a differential unit 7, a geared transmission 8, a reduction mechanism 9, and a case 10.

For example, an internal combustion engine such as a gasoline engine and a diesel engine may be adopted as the engine 2, and the engine 2 is arranged outside of the case 10. As illustrated in FIG. 4, a crank shaft 2a as an output shaft of the engine 2 is connected to an input shaft 6d of the power split mechanism 6 through a flywheel 11 and a damper 12. In the drive unit 1, the engine 2 is arranged such that the crank shaft 2a of the engine 2 extends along a first rotational axis AL1. That is, a rotational center axis of the crank shaft 2a of the engine 2 corresponds to the first rotational axis AL1.

The first motor 3 is arranged in the case 10 coaxially with the engine 2. In other words, the first motor 3 is also arranged around the first rotational axis AL1. The first motor 3 serves not only as a motor to generate torque when driven by electricity suppled thereto, but also as a generator to generate electricity when driven by torque applied thereto from an external source. That is, the first motor 3 is a motor-generator, and for example, a permanent magnet type synchronous motor and an induction motor may be adopted as the first motor 3. The first motor 3 is connected to the power split mechanism 6 so that an output torque of the engine 2 is distributed to the first motor 3 through the power split mechanism 6, and an output torque of the first motor 3 is delivered to the power split mechanism 6.

The second motor 4 is also arranged in the case 10 around a second rotational axis AL2 extending parallel to the first rotational axis AL1. Specifically, a rotor shaft 4a of the second motor 4 extends around one of the driveshafts 5 extending along the second rotational axis AL2. That is, a rotational center axis of the rotor shaft 4a of the second motor 4 corresponds to the second rotational axis AL2. The second motor 4 serves mainly as a drive motor to generate torque to propel the vehicle when driven by electricity suppled thereto. The second motor 4 may also be a motor-generator to generate electricity when driven by torque applied thereto from an external source. For example, a permanent magnet type synchronous motor, and an induction motor may also be adopted as the second motor 4. Specifically, the second motor 4 is connected to the differential unit 7 through the reduction mechanism 9 so that the output torque of the second motor 4 is delivered to the differential unit 7 while being multiplied by the reduction mechanism 9.

The first motor 3 and the second motor 4 are connected to each other through a power control unit 15 including a battery and an inverter (neither of which are shown) so that electricity generated by the first motor 3 may be supplied to the second motor 4 to operate the second motor 4 as a motor. In addition, the first motor 3 and the second motor 4 may be driven by electricity supplied from the power control unit, and the battery of the power control unit 15 may be charged with electricity generated by the first motor 3 and the second motor 4.

Output torque(s) of the prime mover is/are distributed to a right drive wheel 13 and a left drive wheel 13 through the driveshafts 5. As described, the driveshafts 5 extend coaxially with the second motor 4 along the second rotational axis AL2.

The power split mechanism 6 is also arranged coaxially with the engine 2 and the first motor 3. In other words, the power split mechanism 6 is formed around the first rotational axis AL1. Specifically, the power split mechanism 6 is a single-pinion planetary gear set serving as a differential mechanism comprising: a first carrier 6a as an input element; a first sun gear 6b as a reaction element; and a first ring gear 6c as an output element.

In the power split mechanism 6, the input shaft 6d extends along the first rotational axis AL1 to be joined to the crank shaft 2a of the engine 2 through the flywheel 11 and the damper 12, and the first carrier 6a is connected to the input shaft 6d to be rotated integrally with the input shaft 6d. That is, the first carrier 6a is connected to the engine 2 through the input shaft 6d.

The first sun gear 6b of the power split mechanism 6 is connected to a rotor shaft 3a of the first motor 3 extending around the first rotational axis AL1 so that the first sun gear 6b is rotated integrally with the rotor shaft 3a.

The first ring gear 6c of the power split mechanism 6 is connected to a counter driveshaft 8d of the geared transmission 8 extending along the first rotational axis AL1 to be rotated integrally with the counter driveshaft 8d, and a counter drive gear 8a of the geared transmission 8 is mounted on the counter driveshaft 8d. Thus, the first ring gear 6c of the power split mechanism 6 is connected to the counter drive gear 8a of the geared transmission 8. As illustrated in FIG. 4, a parking gear 14 is mounted on the counter driveshaft 8d to form a parking mechanism together with a parking pawl (not shown).

The output torque of the engine 2 delivered to the power split mechanism 6 is distributed to the first motor 3 from the first sun gear 6b, and to the driveshafts 5 from the first ring gear 6c. In other words, in the power split mechanism 6, the output torque of the engine 2 is split by the first carrier 6a serving as an input element and the first ring gear 6c serving as an output element. In this situation, a rotational speed of the engine 2 connected to the first carrier 6a may be adjusted by operating the first motor 3 as a generator, while controlling a regenerative torque (i.e., a negative torque) applied to the first sun gear 6b serving as a reaction element.

The differential unit 7 as a final reduction mechanism is formed around the second rotational axis AL2. Specifically, the differential unit 7 is arranged coaxially with the second motor 4 between the driveshafts 5 so that the output torque of the second motor 4 is delivered to the differential unit 7, and that the driveshafts 5 are allowed to rotate at different speeds. That is, the output torque of the prime mover is distributed to the right driveshaft 5 and the left driveshaft 5 through the differential unit 7. For example, a conventional vehicular open differential unit may be adopted as the differential unit 7. The differential unit 7 comprises a differential case 7a holding e.g., a side gear (not shown) therein. The differential case 7a is allowed to rotate, and a differential ring gear 8c of the geared transmission 8 is mounted on the differential case 7a to be rotated integrally with the differential case 7a. According to the first example, as illustrated in FIG. 4, two sets of planetary gear sets 7b and 7c are combined in parallel to form the differential unit 7. As described, the second motor 4 is connected to the differential unit 7 through the reduction mechanism 9 so that the output torque of the second motor 4 is delivered to the differential unit 7 while being multiplied by the reduction mechanism 9.

The torque is transmitted between the power split mechanism 6 and the differential unit 7 through the geared transmission 8. Specifically, a gear train of the geared transmission 8 comprises the counter drive gear 8a, a counter driven gear 8b, and the differential ring gear 8c.

The counter drive gear 8a of the geared transmission 8 is arranged coaxially with the engine 2, the first motor 3, and the power split mechanism 6. Specifically, the counter drive gear 8a is mounted on one end of the counter driveshaft 8d to be rotated integrally with the counter driveshaft 8d while being meshed with the counter driven gear 8b, and the other end of the counter driveshaft 8d is connected to the first ring gear 6c of the power split mechanism 6. That is, the counter drive gear 8a, the counter driveshaft 8d, and the first ring gear 6c are rotated integrally.

The counter driven gear 8b is arranged around a third rotational axis AL3 extending parallel to the first rotational axis AL1 and the second rotational axis AL2. Specifically, the counter driven gear 8b is mounted on a counter shaft 8e of the geared transmission 8 extending along the third rotational axis AL3 to be rotated integrally with the counter shaft 8e, while being meshed not only with the counter drive gear 8a but also with the differential ring gear 8c. Thus, a rotational center axis of the counter driven gear 8b corresponds to the third rotational axis AL3.

The differential ring gear 8c is arranged coaxially with the second motor 4, the driveshafts 5, and the differential unit 7. That is, the differential ring gear 8c is arranged around the second rotational axis AL2. As described, the differential ring gear 8c is connected to the differential case 7a to be rotated integrally with the differential case 7a. The differential ring gear 8c is also connected to a second carrier 9e of the reduction mechanism 9 so that the differential ring gear 8c is rotated integrally with the differential case 7a and the second carrier 9e.

The reduction mechanism 9 is arranged coaxially with the second motor 4, the driveshafts 5, the differential unit 7, and the differential ring gear 8c. That is, the reduction mechanism 9 is also arranged around the second rotational axis AL2. According to the first example, a stepped-pinion planetary gear set is adopted as the reduction mechanism 9. Specifically, the reduction mechanism 9 comprises: a second sun gear 9a, a second ring gear 9b, a diametrically larger pinion 9c, a diametrically smaller pinion 9d, and a second carrier 9e.

In the reduction mechanism 9, the second sun gear 9a is mounted on the rotor shaft 4a of the second motor 4 to be rotated integrally with the rotor shaft 4a. That is, the second sun gear 9a is arranged around the second rotational axis AL2 to be connected to the second motor 4.

The second ring gear 9b is also arranged around the second rotational axis AL2 while being fixed to the case 10. That is, the second ring gear 9b is not allowed to rotate.

The second carrier 9e is also arranged around the second rotational axis AL2 to be connected to the differential ring gear 8c of the geared transmission 8 through the differential case 7a of the differential unit 7. As illustrated in FIG. 4, the diametrically larger pinion 9c and the diametrically smaller pinion 9d that is diametrically smaller than the diametrically larger pinion 9c are formed integrally to form a stepped-pinion so that the diametrically larger pinion 9c and the diametrically smaller pinion 9d rotates integrally. In the stepped-pinion, the diametrically larger pinion 9c is meshed with the second sun gear 9a, and the diametrically smaller pinion 9d is meshed with the second ring gear 9b. The stepped-pinion thus having the diametrically larger pinion 9c and the diametrically smaller pinion 9d is supported by a pinion shaft 9f of the second carrier 9e in a rotatable manner.

According to the first example, in the reduction mechanism 9, the second sun gear 9a serves as an input element, the second ring gear 9b serves as a fixed (or reaction) element, and the second carrier 9e serves as an output element. In the reduction mechanism 9, a rotational speed of the second carrier 9e is reduced slower than a rotational speed of the second sun gear 9a. That is, the output torque of the second motor 4 is delivered to the differential unit 7 while being multiplied by the reduction mechanism 9. In general, a speed reducing ratio of the stepped-pinion planetary gear set is greater than a speed reducing ratio of the conventional planetary gear set without employing a stepped-pinion.

Specifically, the reduction mechanism 9 is positioned without overlapping with any of the engine 2, the first motor 3, and the counter drive gear 8a arranged around the first rotational axis AL1, in a direction along the first rotational axis AL1, the second rotational axis AL2, and the third rotational axis AL3 (as will be simply called the "axial direction" hereinafter). In other words, the reduction mechanism 9 is offset from the engine 2, the first motor 3, and the counter drive gear 8a in the axial direction along the first rotational axis AL1, the second rotational axis AL2, and the third rotational axis AL3.

According to the first example, the engine 2, the first motor 3, the power split mechanism 6, and the counter drive gear 8a are arranged in order in the axial direction (from right to left in FIGS. 2 and 4) around the first rotational axis AL1. Whereas, the second motor 4, the reduction mechanism 9, and the differential ring gear 8c are arranged in order in the axial direction from a side at which the engine 2 is situated around the second rotational axis AL2.

That is, according to the first example, the reduction mechanism 9 arranged around the second rotational axis AL2 overlaps with the power split mechanism 6 arranged around the first rotational axis AL1 in the axial direction.

Thus, the counter drive gear 8a formed around the first rotational axis AL1, the differential ring gear 8c formed around the second rotational axis AL2, and the counter driven gear 8b formed around the third rotational axis AL3 overlap with one another in the axial direction to form the geared transmission 8. In addition, the engine 2 and the first motor 3 are diametrically larger than the power split mechanism 6. According to the first example, therefore, the reduction mechanism 9 is positioned without overlapping with the engine 2 and the first motor 3 in the axial direction while overlapping with the power split mechanism 6 whose outer diameter is relatively smaller. For this reason, a space for enlarging an outer diameter of the reduction mechanism 9 can be maintained between an outer circumference of the reduction mechanism 9 and the first rotational axis AL1.

That is, in the reduction mechanism 9, the diametrically larger pinion 9c of the stepped-pinion may be diametrically enlarged thereby increasing a speed reducing ratio of the reduction mechanism 9. According to the first example, therefore, the output torque of the second motor 4 can be further multiplied to be delivered to the differential unit 7. For this reason, the second motor 4 may be downsized.

According to the first example, at least the first motor 3, the second motor 4, the power split mechanism 6, the differential unit 7, the geared transmission 8, and the reduction mechanism 9 are held in the case 10, and the engine 2 is arranged outside of the case 10. As described, the case 10 supports the driveshafts 5 in a rotatable manner.

As shown in FIG. 4, the case 10 comprises a first bulkhead 10a, a second bulkhead 10b, a third bulkhead 10c, a fourth bulkhead 10d, a first bearing 10e, a second bearing 10f, a third bearing 10g, a fourth bearing 10h, a fifth bearing 10i, a sixth bearing 10j, a seventh bearing 10k, and an eighth bearing 10l.

The first bulkhead 10a closes one end (i.e., right end in FIG. 4) of the case 10 in the axial direction. According to the first example, the first bulkhead 10a is formed between one end of the first motor 3 in the axial direction and the engine 2. That is, a space of the case 10 holding the first motor 3 and a site where the engine 2 is disposed are divided by the first bulkhead 10a serving as an outer wall of the case 10.

The second bulkhead 10b closes the other end of the first motor 3 in the axial direction. According to the first example, in the case 10, the second bulkhead 10b is formed between the first motor 3 and the power split mechanism 6. In other words, the space holding the first motor 3 and a space holding the power split mechanism 6 are defined by the second bulkhead 10b. That is, the second bulkhead 10b serves as a motor cover, and the second bulkhead 10b is fixed to an inner surface of the case 10 by a bolt.

The third bulkhead 10c closes one end of the geared transmission 8 in the axial direction. According to the first example, in the case 10, the third bulkhead 10c is formed between the power split mechanism 6 and the geared transmission 8. In other words, the space holding the power split mechanism 6 and a space holding the geared transmission 8 are defined by the third bulkhead 10c. That is, the third bulkhead 10c serves as a center support, and the third bulkhead 10c is fixed to the inner surface of the case 10 by a bolt.

The fourth bulkhead 10d closes the other end (i.e., left end in FIG. 4) of the case 10. That is, the fourth bulkhead 10d closes the other end of the geared transmission 8 in the axial direction to serve as an outer wall of the case 10.

The first bearing 10e is held by the first bulkhead 10a. According to the first example, the first bearing 10e rotatably supports one end of the rotor shaft 3a of the first motor 3 in the axial direction that is connected to the engine 2.

The second bearing 10f is held by the second bulkhead 10b. According to the first example, the second bearing 10f rotatably supports the other end of the rotor shaft $3a$ of the first motor 3 in the axial direction that is connected to the power split mechanism 6.

Thus, both ends of the rotor shaft $3a$ of the first motor 3 are supported by the first bearing $10e$ and the second bearing $10f$. According to the first example, the input shaft $6d$ of the power split mechanism 6 penetrates through a hollow space of the rotor shaft $3a$ as a hollow shaft, and in addition, the third bearing $10g$ and the fourth bearing $10h$ are interposed between an inner circumferential surface of the rotor shaft $3a$ and an outer circumferential surface of the input shaft $6d$. That is, both ends of the input shaft $6d$ are also supported by the first bearing $10e$ and the second bearing $10f$ through the third bearing $10g$ and the fourth bearing $10h$.

Whereas, the first sun gear $6b$ of the power split mechanism 6 is substantially cantilevered by the rotor shaft $3a$ of the first motor 3. However, in the power split mechanism 6, reaction forces among the gears are cancelled one another out, and hence the rotor shaft $3a$ will not be subjected to a bending moment. Likewise, the first carrier $6a$ of the power split mechanism 6 is substantially cantilevered by the input shaft $6d$. However, since the reaction forces among the gears are cancelled one another out in the power split mechanism 6, the input shaft $6d$ will also not be subjected to a bending moment. For these reasons, loads applied to the first bearing $10e$ and the second bearing $10f$ may be reduced, and hence the first bearing $10e$ and the second bearing $10f$ may be downsized.

The fifth bearing $10i$ is held by the third bulkhead $10c$ to support one end of the counter drive gear $8a$ in the axial direction. According to the first example, specifically, the fifth bearing $10i$ rotatably supports one end of the counter driveshaft $8d$ on which the counter drive gear $8a$ is mounted, and which is joined to the input shaft $6d$ of the power split mechanism 6.

The sixth bearing $10j$ is held by the fourth bulkhead $10d$ to support the other end of the counter drive gear $8a$ in the axial direction. According to the first example, specifically, the sixth bearing $10j$ rotatably supports the other end of the counter driveshaft $8d$ on which the counter drive gear $8a$ is mounted in the axial direction.

The seventh bearing $10k$ is also held by the third bulkhead $10c$ to support one end of the counter driven gear $8b$ in the axial direction. According to the first example, specifically, the seventh bearing $10k$ rotatably supports one end of the counter shaft $8e$ on which the counter driven gear $8b$ is mounted, and which is supported by the third bulkhead $10c$.

The eighth bearing $10l$ is also held by the fourth bulkhead $10d$ to support the other end of the counter driven gear $8b$ in the axial direction. According to the first example, specifically, the eighth bearing $10l$ rotatably supports the other end of the counter shaft $8e$ on which the counter driven gear $8b$ is mounted in the axial direction.

Thus, both ends of the counter driveshaft $8d$ on which the counter drive gear $8a$ is mounted in the axial direction are supported by the fifth bearing $10i$ and the sixth bearing $10j$. Likewise, both ends of the counter shaft $8e$ on which the counter driven gear $8b$ is mounted in the axial direction are supported by the seventh bearing $10k$ and the eighth bearing $10l$.

Whereas, the first ring gear $6c$ of the power split mechanism 6 is substantially cantilevered by the counter driveshaft $8d$. However, in the power split mechanism 6, the reaction forces among the gears are cancelled one another out, and hence the counter driveshaft $8d$ will not be subjected to a bending moment. For this reason, loads applied to the fifth bearing $10i$ and the sixth bearing $10j$ may be reduced, and hence the fifth bearing $10i$ and the sixth bearing $10j$ may be downsized.

Thus, in the drive unit 1 according to the first example, the first motor 3 and the power split mechanism 6 are arranged coaxially with the engine 2 around the first rotational axis AL1, and the second motor 4, the driveshafts 5, the differential unit 7, and the reduction mechanism 9 are arranged coaxially around the second rotational axis AL2 extending parallel to the first rotational axis AL1. In the drive unit 1, the torque is transmitted between the power split mechanism 6 and the differential unit 7 through the counter drive gear $8a$, the counter driven gear $8b$, and the differential ring gear $8c$ of the geared transmission 8. As described, the counter drive gear $8a$ is formed around the first rotational axis AL1, the counter driven gear $8b$ is formed around the second rotational axis AL2, and the differential ring gear $8c$ is formed around the third rotational axis AL3 extending between the rotational axes AL1 and AL2 in parallel therewith. That is, the drive unit 1 according to the first example has a triaxial structure in which the main elements are arranged around the rotational axes AL1, AL2, and AL3. According to the first example, therefore, number of parts of the drive unit 1 may be reduced compared to the conventional drive unit having a quad-axial structure to downsize the drive unit 1 smaller than the conventional drive unit having a quad-axial structure. For this reason, the drive unit 1 according to the first example may be fitted easily into the vehicle.

In addition, since the second motor 4 is arranged coaxially with the differential unit 7 and the driveshafts 5 around the second rotational axis AL2, the drive unit 1 may be downsized especially in the height direction of the vehicle. For this reason, as illustrated in FIG. 3, a space for arranging the power control unit 15 may be enlarged. Further, a crumple space between a bonnet of the vehicle and the drive unit 1 may be maintained sufficiently.

Furthermore, a chain-drive mechanism is not employed in the drive unit 1 to transmit the torque between the power split mechanism 6 and the differential unit 7. That is, noises and vibrations will not be generated by the chain-drive mechanism. For this reason, N.V. performance of the vehicle on which the drive unit 1 is mounted can be improved.

According to the present disclosure, arrangement of the first motor 3, the second motor 4, the power split mechanism 6, the differential unit 7, the geared transmission 8, and the reduction mechanism 9 may be altered arbitrarily according to need. Hereinafter, modifications of the drive unit 1 according to the present disclosure will be explained with reference to FIGS. 5 to 9. In FIGS. 5 to 9, common reference numerals are assigned to the elements in common with those of the first example.

Figure 5:
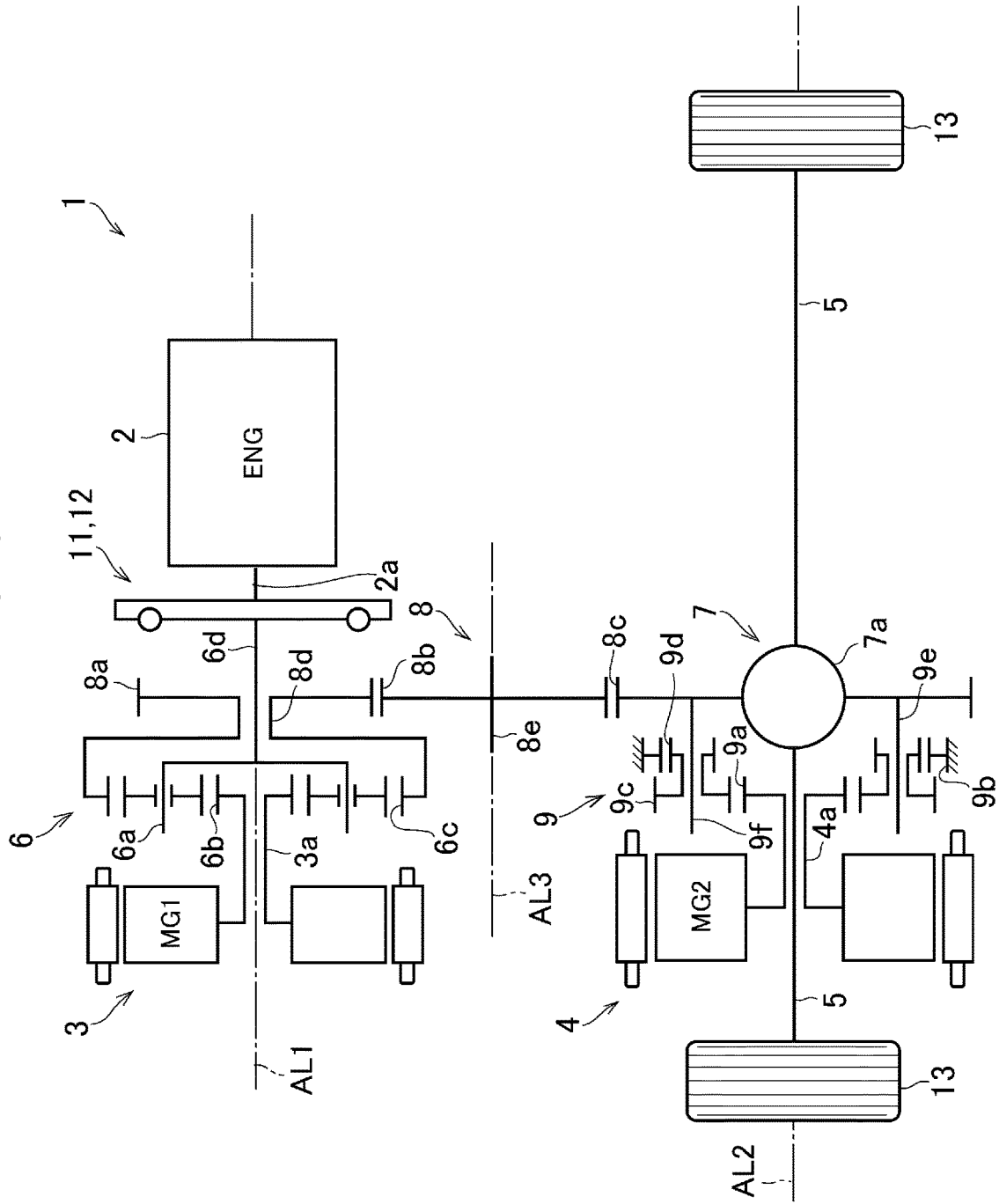
FIG. 5 is a skeleton diagram showing a layout of the drive unit according to the second example of the present disclosure.

Turning to FIG. 5, there is shown a structure of the drive unit 1 according to the second example. As illustrated in FIG. 5, according to the second example, the engine 2, the counter drive gear $8a$, the power split mechanism 6, and the first motor 3 are arranged in order in the axial direction (from right to left in FIG. 5) around the first rotational axis AL1. Whereas, the differential ring gear $8c$, the reduction mechanism 9, and the second motor 4 are arranged in order in the axial direction from the side at which the engine 2 is situated around the second rotational axis AL2.

According to the second example, the reduction mechanism 9 arranged around the second rotational axis AL2 also overlaps with the power split mechanism 6 arranged around the first rotational axis AL1 in the axial direction.

Figure 6:
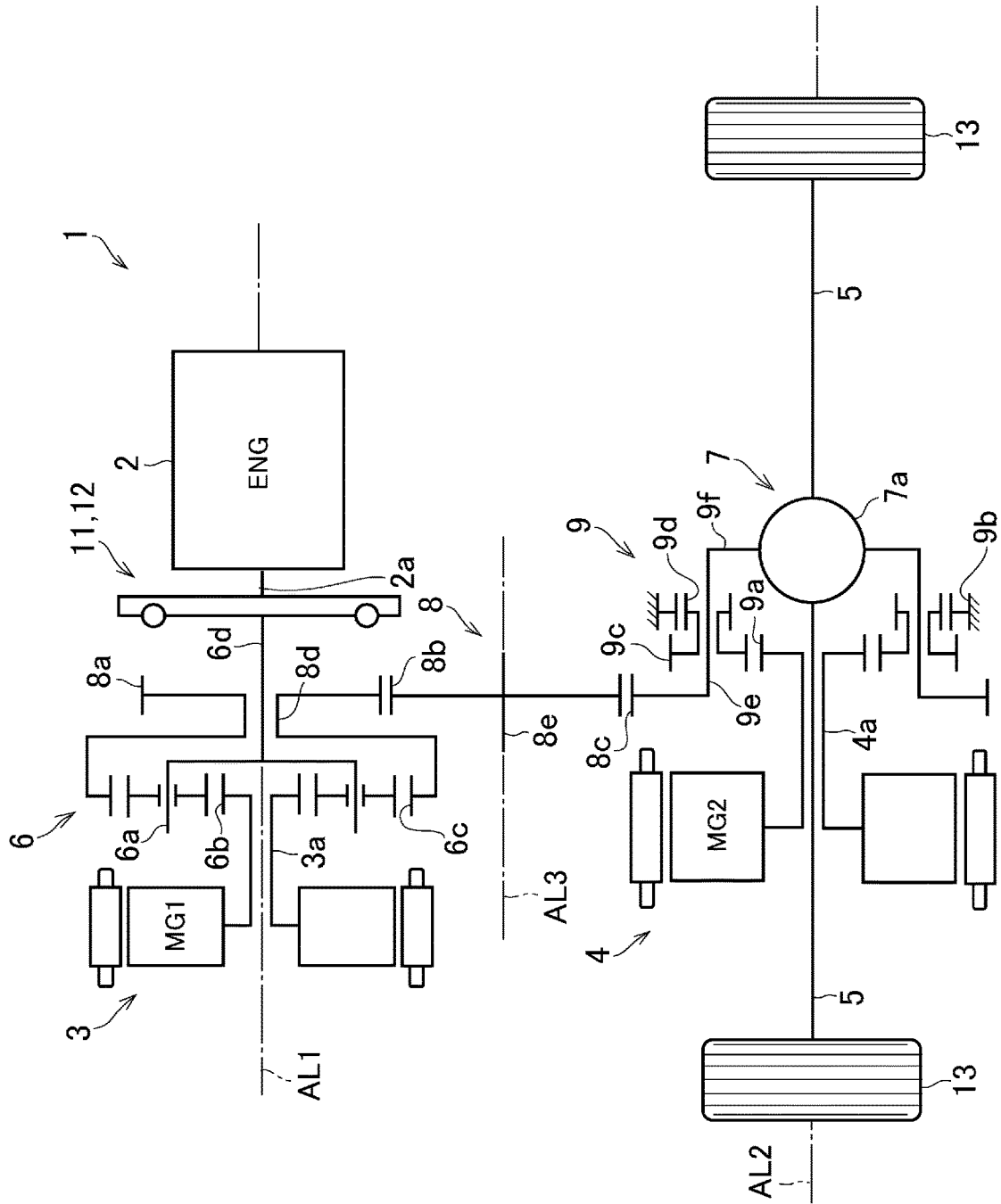
FIG. 6 is a skeleton diagram showing a layout of the drive unit according to the third example of the present disclosure.

Turning to FIG. 6, there is shown a structure of the drive unit 1 according to the third example. As illustrated in FIG. 6, according to the third example, the engine 2, the counter drive gear 8a, the power split mechanism 6, and the first motor 3 are also arranged in order in the axial direction (from right to left in FIG. 6) around the first rotational axis AL1. Whereas, the reduction mechanism 9, the differential ring gear 8c, and the second motor 4 are arranged in order in the axial direction from the side at which the engine 2 is situated around the second rotational axis AL2.

According to the third example, the differential unit 7 may be positioned in the vicinity of a width center of the vehicle compared to the foregoing examples. According to the third example, therefore, the left driveshaft 5 may be elongated compared to that of the first example so that the drive unit 1 may become better balanced.

Figure 7:
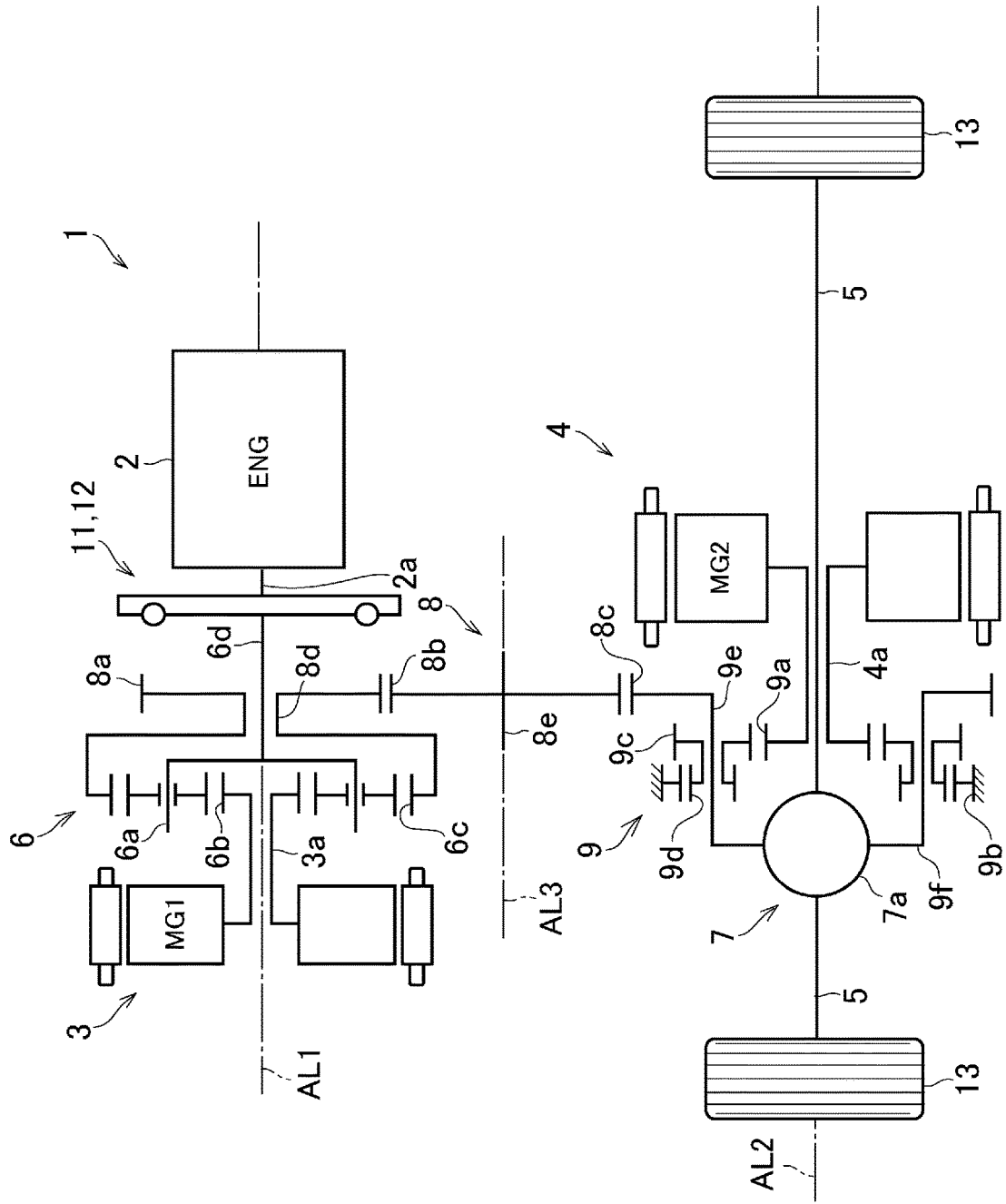
FIG. 7 is a skeleton diagram showing a layout of the drive unit according to the fourth example of the present disclosure.

Turning to FIG. 7, there is shown a structure of the drive unit 1 according to the fourth example. As illustrated in FIG. 7, according to the fourth example, the engine 2, the counter drive gear 8a, the power split mechanism 6, and the first motor 3 are also arranged in order in the axial direction (from right to left in FIG. 7) around the first rotational axis AL1. Whereas, the second motor 4, the differential ring gear 8c, and the reduction mechanism 9 are arranged in order in the axial direction from the side at which the engine 2 is situated around the second rotational axis AL2.

According to the fourth example, the differential unit 7 is positioned between the engine 2 and the first motor 3 in the axial direction. That is, the differential unit 7 may be positioned in the vicinity of a width center of the vehicle compared to the foregoing examples. According to the fourth example, therefore, the left driveshaft 5 may be elongated compared to that of the first example so that the drive unit 1 may become better balanced.

Figure 8:
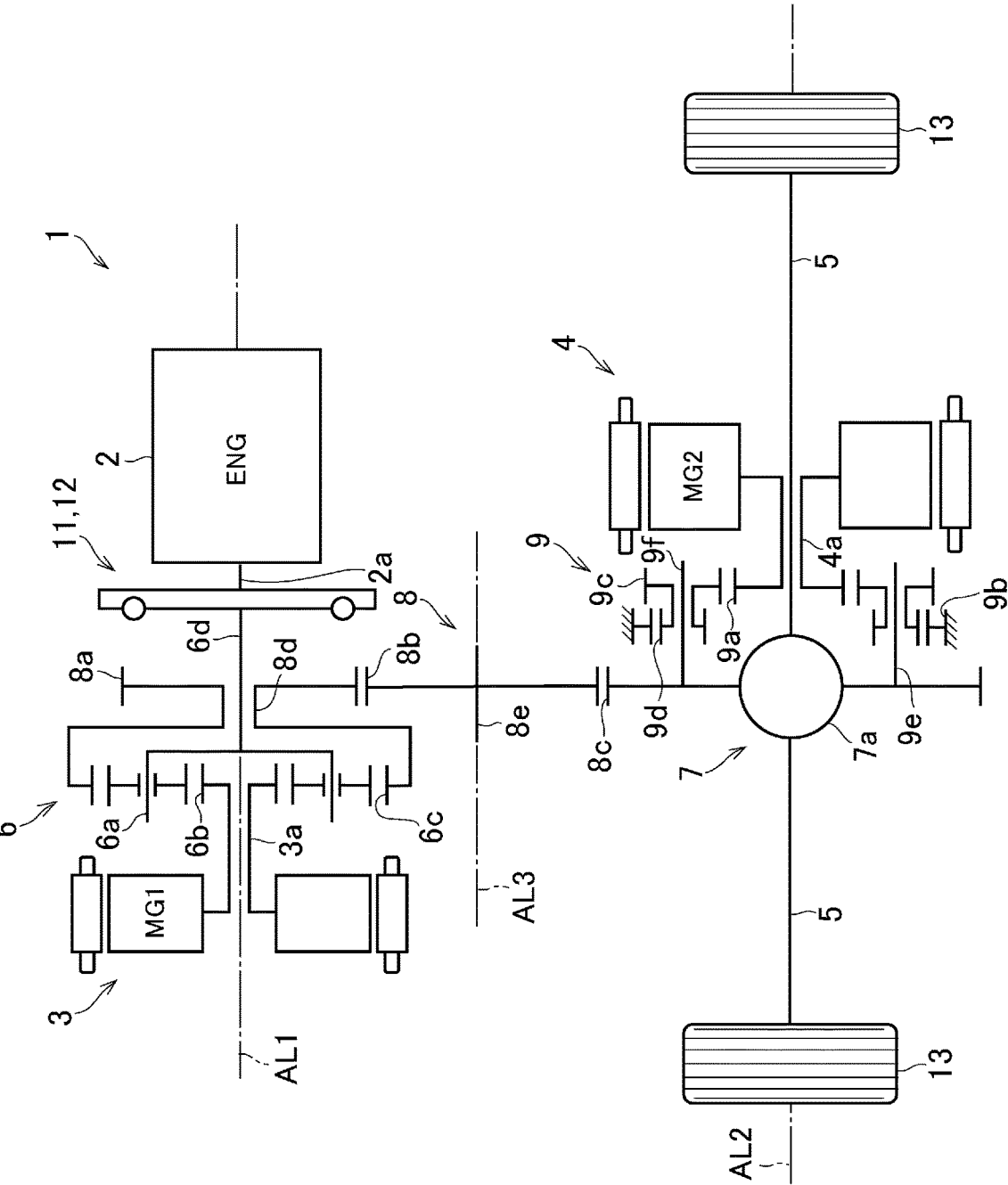
FIG. 8 is a skeleton diagram showing a layout of the drive unit according to the fifth example of the present disclosure.

Turning to FIG. 8, there is shown a structure of the drive unit 1 according to the fifth example. As illustrated in FIG. 8, according to the fifth example, the engine 2, the counter drive gear 8a, the power split mechanism 6, and the first motor 3 are also arranged in order in the axial direction (from right to left in FIG. 8) around the first rotational axis AL1. Whereas, the second motor 4, the reduction mechanism 9, and the differential ring gear 8c are arranged in order in the axial direction from the side at which the engine 2 is situated around the second rotational axis AL2.

According to the fifth example, the differential unit 7 may also be positioned in the vicinity of a width center of the vehicle compared to the foregoing examples. According to the fifth example, therefore, the left driveshaft 5 may be elongated compared to that of the first example so that the drive unit 1 may become better balanced.

Figure 9:
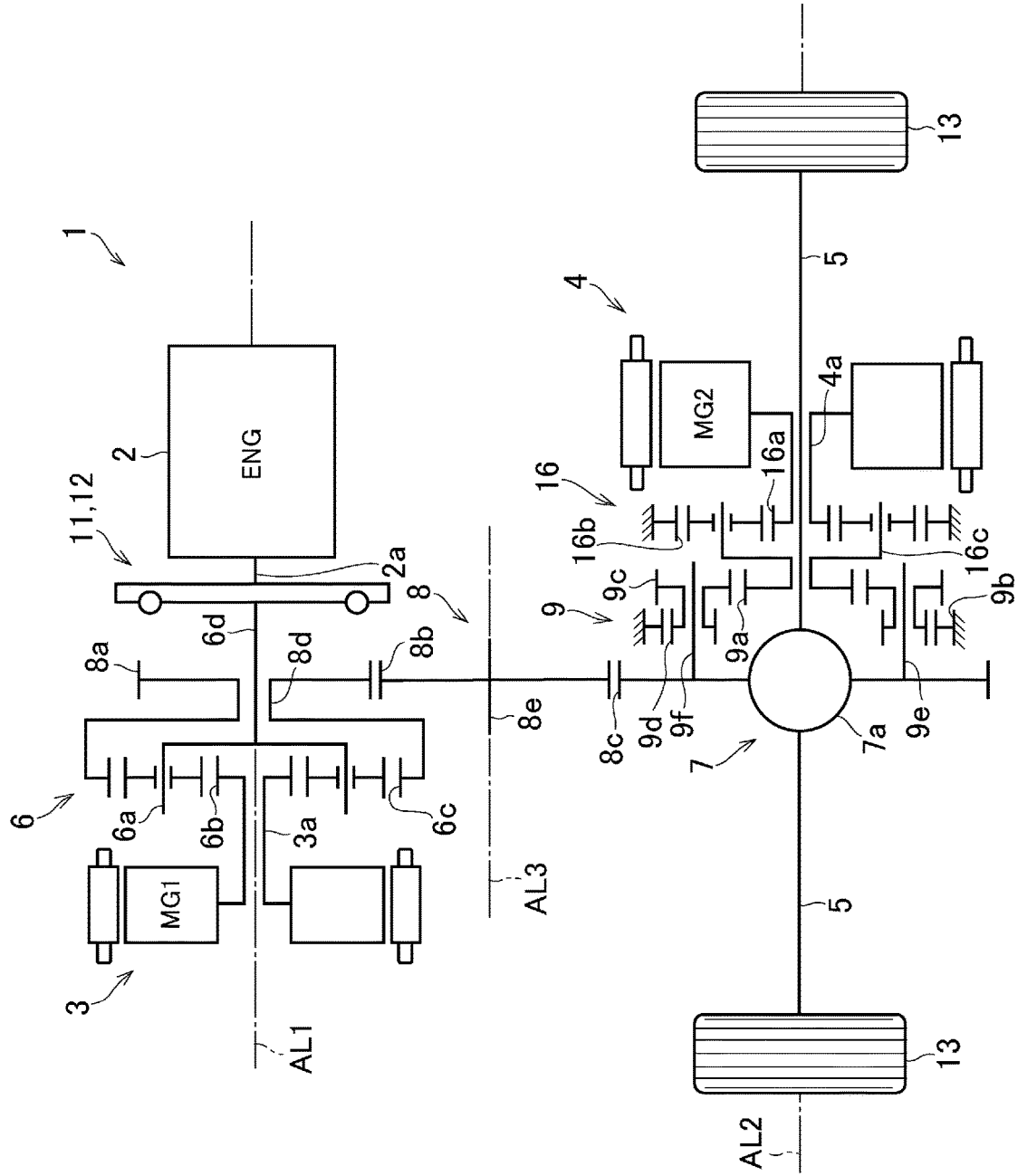
FIG. 9 is a skeleton diagram showing a layout of the drive unit according to the sixth example of the present disclosure.

Turning to FIG. 9, there is shown a structure of the drive unit 1 according to the sixth example. As illustrated in FIG. 9, according to the sixth example, the engine 2, the counter drive gear 8a, the power split mechanism 6, and the first motor 3 are also arranged in order in the axial direction (from right to left in FIG. 9) around the first rotational axis AL1. Whereas, the second motor 4, the reduction mechanism 9, and the differential ring gear 8c are arranged in order in the axial direction from the side at which the engine 2 is situated around the second rotational axis AL2.

According to the sixth example, the drive unit 1 is further provided with an additional reduction mechanism 16 arranged around the second rotational axis AL2 between the second motor 4 and the reduction mechanism 9 so that the output torque of the second motor 4 may be delivered to the reduction mechanism 9 while being multiplied by the additional reduction mechanism 16. Specifically, the additional reduction mechanism 16 is a single-pinion planetary gear set comprising: a third sun gear 16a as an input element that is connected to the rotor shaft 4a of the second motor 4; a third ring gear 16b as a reaction element that is fixed and not allowed to rotate; and a third carrier 16c as an output element that is connected to the second sun gear 9a of the reduction mechanism 9. Instead, the additional reduction mechanism 16 may also be formed integrally with the reduction mechanism 9 to serve as a complex planetary gear unit.

According to the sixth example, therefore, the output torque of the second motor 4 may be further multiplied by the additional reduction mechanism 16. For this reason, the second motor 4 may be further downsized.

What is claimed is:

1. A drive unit for a hybrid vehicle, the drive unit comprising:
    a prime mover including an engine, a first motor, and a second motor;
    a pair of driveshafts each of which is connected to a respective one of a right drive wheel and a left drive wheel;
    a power split mechanism that distributes an output torque of the engine to the first motor and the driveshafts;
    a differential unit to which an output torque of the second motor is delivered, and which allows the driveshafts to rotate at different speeds;
    a geared transmission that transmits a torque between the power split mechanism and the differential unit; and
    a reduction mechanism that multiplies the output torque of the second motor to be delivered to the differential unit, wherein
    the power split mechanism includes a planetary gear set comprising
        an input element that is connected to the engine,
        a reaction element that is connected to the first motor, and
        an output element,
    the geared transmission comprises
        a counter drive gear that is connected to the output element,
        a counter driven gear that is meshed with the counter drive gear, and
        a differential ring gear that is meshed with the counter driven gear to transmit the torque to the differential unit,
    the engine, the first motor, the power split mechanism, and the counter drive gear are arranged around a first rotational axis,
    the differential unit, the second motor, the reduction mechanism, the driveshafts, and the differential ring gear are arranged around a second rotational axis extending parallel to the first rotational axis,
    the counter driven gear is arranged around a third rotational axis extending parallel to the second rotational axis and the first rotational axis,
    the reduction mechanism is offset from the engine, the first motor, and the counter drive gear in an axial direction of the first, second and third rotational axes so that the reduction mechanism does not overlap with any of the engine, the first motor, and the counter drive gear in the axial direction, and
    the first, second and third rotational axes are spaced apart from each other in a direction perpendicular to the axial direction, with the third rotational axis being located between the first rotational axis and the second rotational axis in the direction perpendicular to the axial direction.

2. The drive unit as claimed in claim 1, wherein the reduction mechanism is not offset from the power split mechanism in the axial direction so that the reduction mechanism overlaps with the power split mechanism in the axial direction.

3. The drive unit as claimed in claim 1, wherein
the engine, the first motor, the power split mechanism, and the counter drive gear are arranged in order from one side in the axial direction, and
the second motor, the reduction mechanism, and the differential ring gear are arranged in order in the axial direction from said one side.

4. The drive unit as claimed in claim 1, wherein
the power split mechanism includes a planetary gear set comprising
a first carrier that serves as the input element,
a first sun gear that serves as the reaction element, and
a first ring gear that serves as the output element, and
the reduction mechanism includes a stepped-pinion planetary gear set comprising
a second sun gear that is connected to the second motor,
a second ring gear that is fixed and not allowed to rotate,
a diametrically larger pinion that is meshed with the second sun gear,
a diametrically smaller pinion that is diametrically smaller than the diametrically larger pinion, and that is rotated integrally with the diametrically larger pinion while being meshed with the second ring gear, and
a second carrier that is connected to the differential ring gear while supporting the diametrically larger pinion and the diametrically smaller pinion.

5. The drive unit as claimed in claim 4, further comprising:
a case that holds the first motor, the power split mechanism, the geared transmission, the differential unit, the reduction mechanism, and the second motor, wherein
the case comprises a first bulkhead that closes a first end of the first motor in the axial direction, and a second bulkhead that closes a second end of the first motor in the axial direction,
the first motor comprises a hollow rotor shaft that rotates integrally with a rotor of the first motor,
the power split mechanism further comprises an input shaft that is connected to the engine and that is rotated integrally with the first carrier,
ends of the hollow rotor shaft are respectively supported by a first bearing held by the first bulkhead and a second bearing held by the second bulkhead, and
ends of the input shaft are also respectively supported by the first bearing and the second bearing through a third bearing and a fourth bearing arranged in a hollow space of the hollow rotor shaft.

6. The drive unit as claimed in claim 5, wherein
the case further comprises a third bulkhead that closes a first end of the geared transmission in the axial direction, and a fourth bulkhead that closes a second end of the geared transmission in the axial direction,
ends of the counter drive gear are respectively supported by a fifth bearing held by the third bulkhead and a sixth bearing held by the fourth bulkhead, and
ends of the counter driven gear are respectively supported by a seventh bearing held by the third bulkhead and an eighth bearing held by the fourth bulkhead.

7. The drive unit as claimed in claim 1, wherein
the engine, the counter drive gear, the power split mechanism, and the first motor are arranged in order from one side in the axial direction, and
the differential ring gear, the reduction mechanism, and the second motor are arranged in order in the axial direction from said one side in the axial direction.

8. The drive unit as claimed in claim 1, wherein
the engine, the counter drive gear, the power split mechanism, and the first motor are arranged in order from one side in the axial direction, and
the reduction mechanism, the differential ring gear, and the second motor are arranged in order in the axial direction from said one side.

9. The drive unit as claimed in claim 1, wherein
the engine, the counter drive gear, the power split mechanism, and the first motor are arranged in order from one side in the axial direction, and
the second motor, the differential ring gear, and the reduction mechanism are arranged in order in the axial direction from said one side in the axial direction.

10. The drive unit as claimed in claim 1, wherein
the engine, the counter drive gear, the power split mechanism, and the first motor are arranged in order from one side in the axial direction, and
the second motor, the reduction mechanism, and the differential ring gear are arranged in order in the axial direction from said one side.

11. The drive unit as claimed in claim 1, further comprising:
an additional reduction mechanism that is arranged between the second motor and the reduction mechanism to multiply the output torque of the second motor to be delivered to the reduction mechanism.

12. The drive unit as claimed in claim 1,
the counter drive gear, the counter driven gear, and the differential ring gear are arranged in a line that extends in the direction perpendicular to the axial direction.

13. The drive unit as claimed in claim 1, wherein
an outer circumference of the reduction mechanism overlaps with an outer circumference of the first motor when viewed in the axial direction.

14. The drive unit as claimed in claim 13,
the outer circumference of the reduction mechanism overlaps with an outer circumference of the counter driven gear when viewed in the axial direction.

15. The drive unit as claimed in claim 1, wherein
an outer circumference of the reduction mechanism overlaps with an outer circumference of the counter driven gear when viewed in the axial direction.

* * * * *